March 22, 1932.    G. E. DEAN    1,850,341
ROAD SCRAPER
Filed March 10, 1930    4 Sheets-Sheet 1

Inventor
George E. Dean
By Liverance and Van Antwerp
Attorneys

March 22, 1932. G. E. DEAN 1,850,341
ROAD SCRAPER
Filed March 10, 1930 4 Sheets-Sheet 2

Inventor
George E. Dean
By Lurance and
Van Antwerp
Attorneys

Inventor
George E. Dean

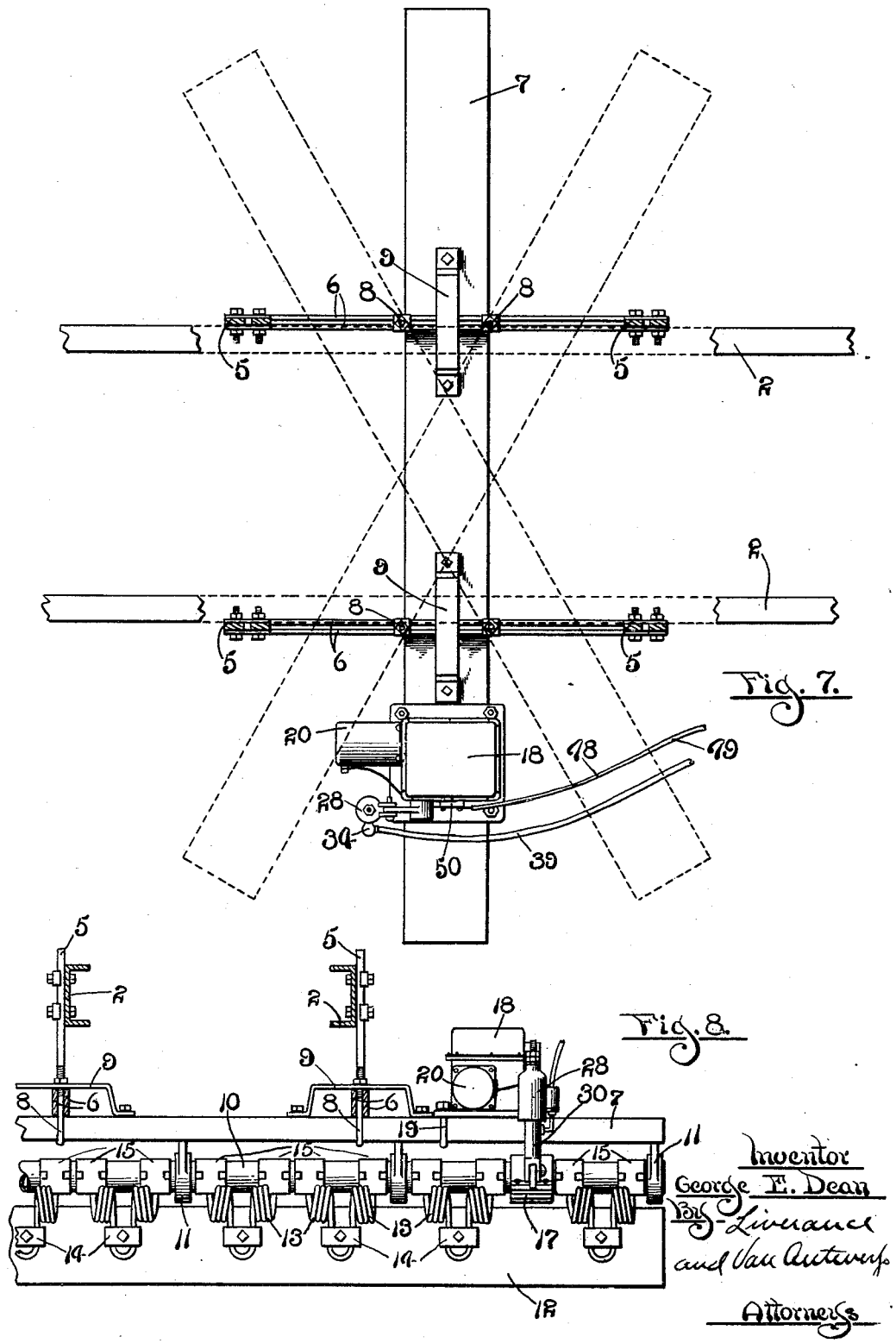

Patented Mar. 22, 1932

1,850,341

UNITED STATES PATENT OFFICE

GEORGE E. DEAN, OF GRAND RAPIDS, MICHIGAN, ASSIGNOR TO CHARLES G. WILLETT, OF GRAND RAPIDS, MICHIGAN

ROAD SCRAPER

Application filed March 10, 1930. Serial No. 434,492.

This invention relates to road scrapers and more particularly to the adjusting and pressure actuating means therefor. The invention further is particularly directed to road scrapers attached to motor vehicles for road maintenance work although road scrapers embodying this invention may be utilized on other types of vehicles and for other service.

An important object of the invention is to provide, on a road scraper, which is mounted on a vehicle for adjustment in a horizontal plane in various angles relative to the vehicle and the road, an adjusting means, for raising the scraper blade from the road or pressing it against the road surface, which is mounted directly upon the scraper structure itself and is carried by and adjusted with the scraper structure. A further object of the invention is to provide such a scraper adjusting means with means for controlling its operation from the driver's seat of the vehicle, the connections between the control means at the driver's seat and the adjusting means on the scraper structure being of an extremely flexible nature whereby adjustment of the scraper structure in its aforesaid angular positions may be readily accomplished.

The invention includes various other new and useful features of construction and arrangement which are hereinafter more fully described and particularly pointed out in the claims, reference being had to the acompanying drawings, in which, Fig. 1 is a side elevation of a motor vehicle having a road scraper embodying my invention operatively mounted thereon.

Fig. 7 is a sectional plan of the scraper structure with the adjusting device mounted thereon illustrating its angular adjustment in a horizontal plane, and Fig. 8 is a transverse cross section substantially on the line 8—8 of Fig. 1 illustrating the means for mounting the scraper structure on the vehicle.

Like reference characters refer to like parts in all of the figures.

Figure 1:
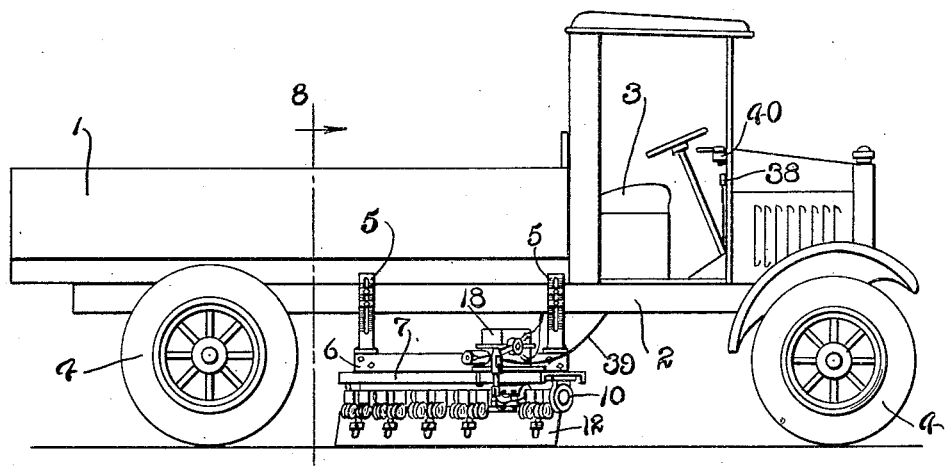
Figure 2:
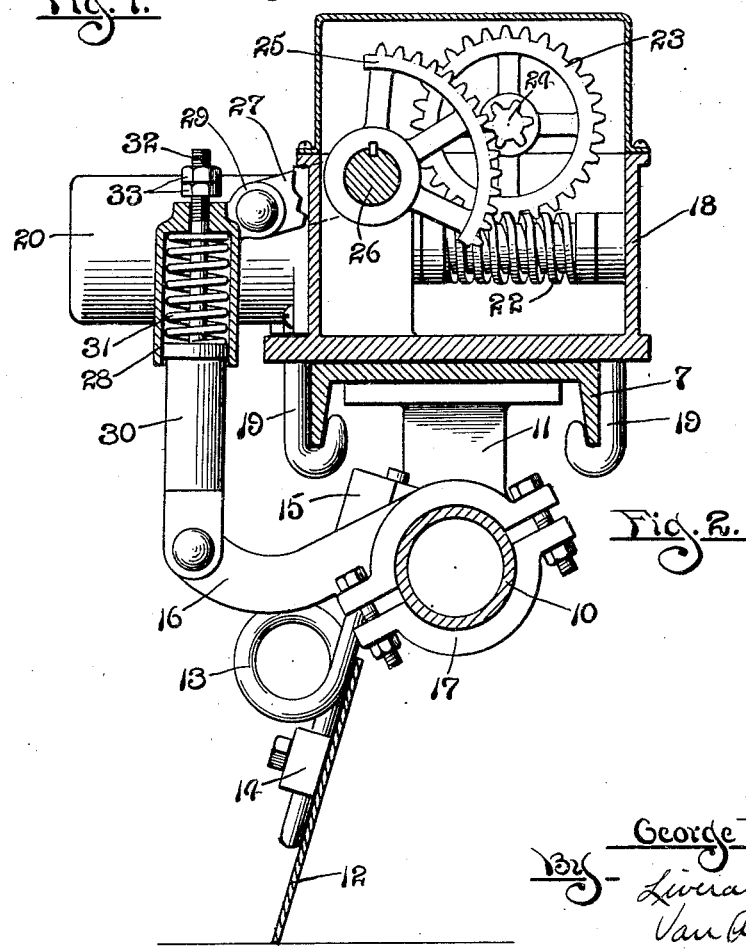
Fig. 2 is a cross section substantially on the lines 2—2 of Fig. 3 showing the scraper blade and its mounting means and details of the adjusting mechanism.
Figure 3:
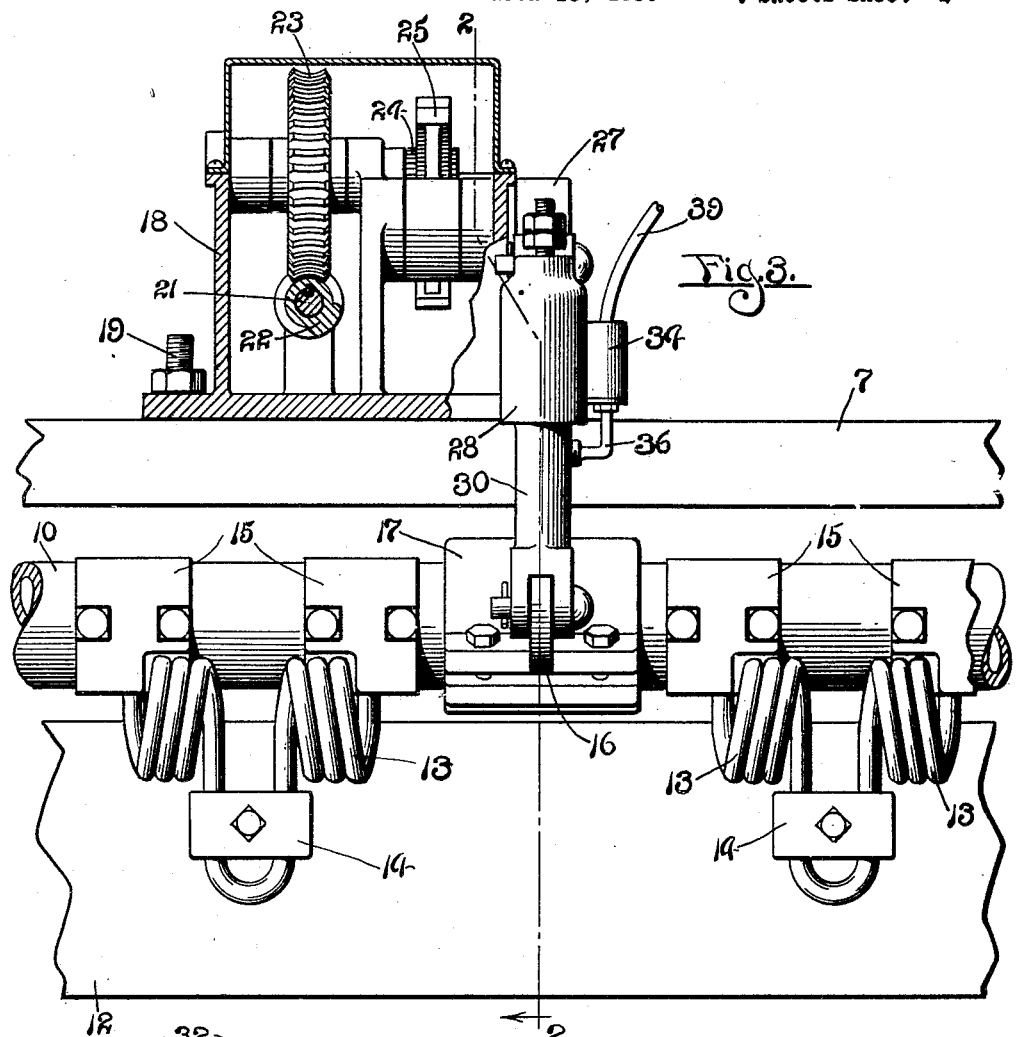
Fig. 3 is a fragmentary rear elevation of the scraper blade structure and the adjusting mechanism with parts broken away.
Figure 4:
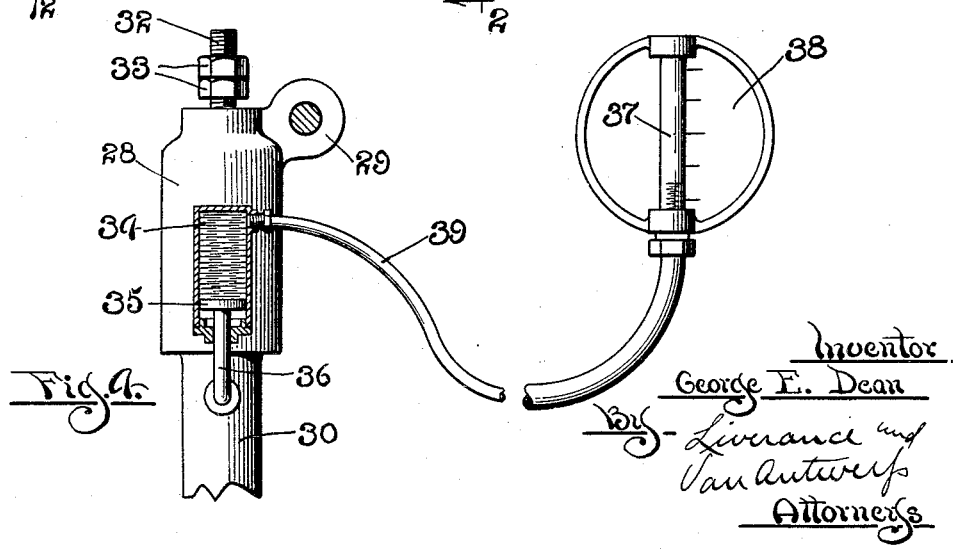
Fig. 4 is a fragmentary view of the pressure indicator forming a part of this invention.
Figure 5:
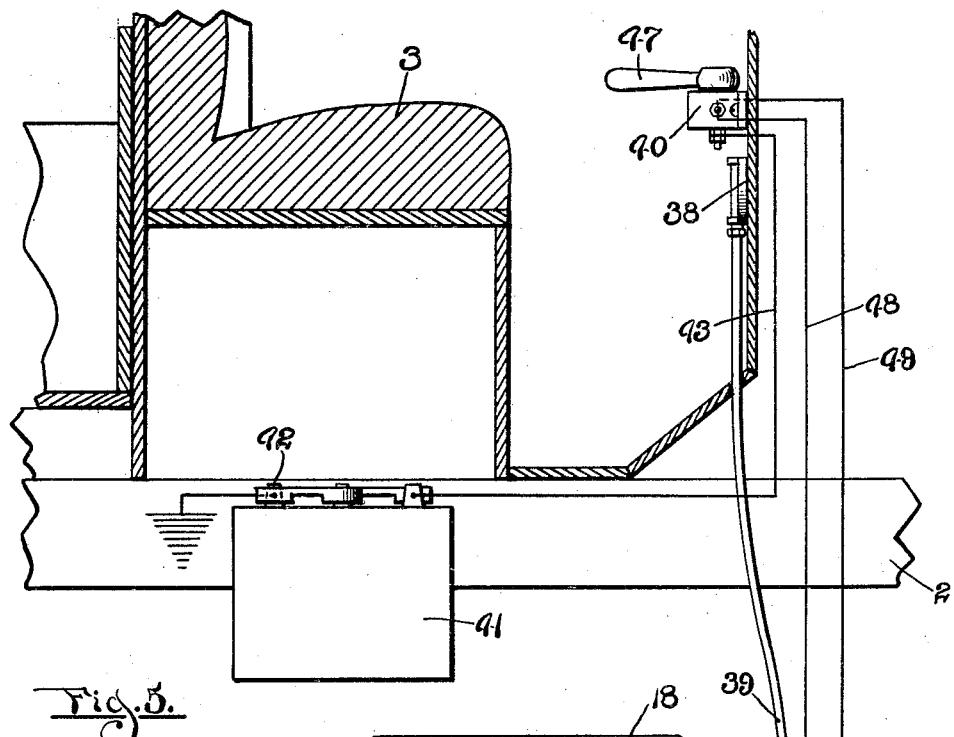
Fig. 5 is a fragmentary view, partially in the diagram, illustrating the association between the control device at the driver's seat and the adjusting mechanism on the scraper structure and the automatic limit switches.
Figure 6:
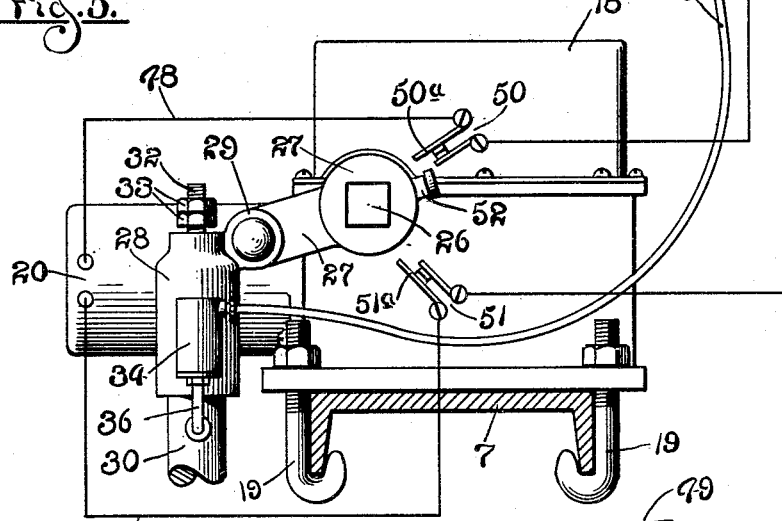
Fig. 6 is a fragmentary sectional plan of the control device at the driver's seat.
Figure 6:
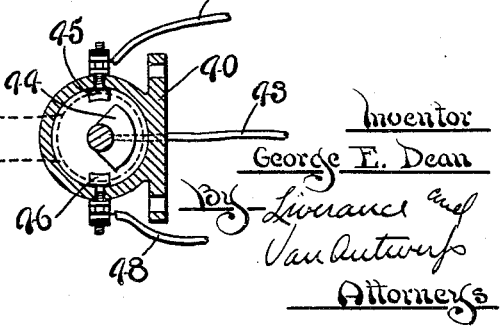

To accomplish the desired result this invention utilizes an electrical apparatus for adjusting the scraper blade and for raising it out of contact with the road surface, a reason for the selection of this type of mechanism being that the connections between the adjusting device on the scraper structure and the control device at the driver's seat may be a flexible electric conductor cable which will permit considerable movement of the adjusting device relative to the control device by nature of the flexibility of said conductor cable and furthermore because a source of electric supply for its operation is customarily accessible on the vehicle to which it is attached.

In the drawings 1 represents a motor vehicle which is customarily in the nature of a relatively heavy truck which has a chassis frame 2, a driver's seat 3 and the customary front and rear wheels 4.

The scraper structure is mounted upon the chassis frame to hang beneath said frame and extend substantially transversely of the length of the vehicle by means of hangers 5 which are attached to the respective side members of the frame 2 and arranged in pairs, each pair being located at a respective side of the machine and each pair having longitudinal bars 6 extending between the lower ends thereof. A beam 7 extends transversely of the machine below the bars 6 and is attached near its respective ends to said bars by clamping bolts 8. Inverted stirrups 9 are attached to the upper surface of the beam and extend over the bars 6 which stirrups act as hangers for the beam on the bars 6 when the clamping bolts 8 are loosened. By this means the transverse angular position of the beam relative to the vehicle may be readily adjusted. Loosening the clamping bolts 8 will release the beam 7 and permit it to hang on the stirrups 9 whereupon it may be swung to the desired angular position by sliding the stirrups on the bars 6 and when properly adjusted the clamping bolts 8 may be tightened to rigidly retain it in that position.

Beneath the beam 7 a tubular rock shaft 10 is mounted, the rock shaft extending parallel with, and longitudinally of the beam 7 and being supported by hangers 11 extending downwardly from the beam in which the rock shaft is rotatively mounted. The scraper blade 12 is hung on springs 13 which are suitably connected to the scraper blade at 14 and also to the rock shaft 10 at 15. The exact blade and spring construction and the means for connecting the springs to the blade and to the rock shaft form no part of this invention but are the subject matter of an application filed October 7, 1931, Serial No. 567,350.

This method of mounting the scraper blade enables it to be brought into contact with the road or to be raised therefrom by oscillation of the rock shaft 10 on which it is mounted. The springs 13 which connect the blade 12 with the rock shaft 10 afford considerable flexibility and assure constant engagement of the blade with the road surface and enable the pressure of the blade against the road to be regulated according to the force used to turn the rock shaft in the blade engaging direction.

An adjusting arm 16 extends radially from the rock shaft 10, preferably in a rearwardly direction and is attached rigidly to the rock shaft by a conventional clamping device 17. The adjusting arm 16 forms the lever by means of which the rock shaft 10 is oscillated to manipulate the blade 12, either to raise it out of contact with the road or to press it against the road with varying pressures. The adjusting mechanism for actuating the adjusting arm 16 which embodies this invention is described as follows:

A housing 18 is mounted on the beam 7, the exact location of the housing on the beam being unimportant but is shown in the drawings as near one of its ends, and the housing is rigidly attached to the beam by clamping bolts 19. It is to be understood that the housing 18 and the adjusting arm must be correspondingly located relative to the length of the scraper structure. A reversible electric motor 20 is mounted on the housing preferably exteriorly thereof, and has its shaft 21 extending into the housing 18 and on the shaft 21 a worm 22 is fixed. It is to be understood that the shaft 21 may be either an integral extension of the shaft of the motor 20 or may be a separate shaft operatively connected thereto. The worm 22 meshes with a worm gear 23 which has a smaller pinion 24 attached to it and the pinion 24 meshes with the gear segment 25 which is fixed to a rock shaft 26 journaled in the housing. The rock shaft 26 preferably extends through one side of the housing and an arm 27 is mounted thereon, the arm 27 extending rearwardly and substantially directly over the adjusting arm 16. In the illustration the outer end of the rock shaft 26 is squared and the hub of the arm 27 has a squared opening to receive it but any other suitable fastening means may be employed.

A yieldable connecting device extends between, and is connected to the respective swinging ends of the levers 16 and 27. This connecting device comprises a spring containing cylinder 28 having an ear 29 to which the swinging end of the lever 27 is pivotally connected and a plunger 30 having its upper end located within the cylinder 28 extends downward and is pivotally connected at its lower end with the swinging end of the adjusting arm 16. A spring 31 is located within the cylinder 28 and bears at its lower end against the upper end of the plunger 30 and at its upper end against the upper closed end of the cylinder 28. A bolt 32 projects from the upper end of the plunger 19 and extends upwardly therefrom through the spring and through the upper head of the cylinder 28 and is provided outside of the head of the cylinder 28 with a nut and lock nut 33.

By the above described mechanism it will be seen that rotation of the motor 20 will rotate the rock shaft 26 through the gears 22, 23, 24 and 25, the direction of such rotation depending upon the direction in which the reversible motor 20 is rotated. If the mechanism is rotated in a direction to raise the arm 27 the nuts 33 will engage the head of the cylinder 28 which is pivotally connected by its ear 29 to the arm 27 and through the bolt 32 will raise the plunger 30 and raise the swinging end of the arm 16 which will oscillate the rock shaft 10 to lift the scraper blade 12 from the road. Reverse rotation of the motor and reverse movement of the parts will lower the scraper blade 12 against the road and when the blade engages the road continued rotation of the motor will act to compress the spring 31 exerting more or less pressure of the blade 12 against the road depending upon the extent to which the spring 31 is compressed before rotation of the motor 20 is stopped.

Under certain working conditions it is desirable to press the blade more firmly against the road than under other conditions and at all times it is desirable to know the extent of such pressure and for this reason a pressure indicating device is included in this invention which is described as follows:

A fluid cylinder 34 is mounted on the side of the spring cylinder 28 and a piston 35 is located within the cylinder 34 which piston is provided with a downwardly extending piston rod 36 which is bent and attached to the plunger 30 below the spring cylinder 28. At a location readily visible by the driver, preferably near the seat of the vehicle, a transparent tube 37 is located, which tube is preferably mounted on a graduated base 38. A flexible hose 39 extends from the lower end of the transparent tube 37 and communicates with the upper end of the fluid cylinder 34 and sufficient fluid is introduced into the cylinder 34 and the hose 39 to completely fill the cylinder 34 above the piston 35 and the hose 39 and to enter the lower end of the transparent tube 37.

By the means above described the pressure exerted by the adjusting mechanism to force the blade 12 against the road is indicated to the operator in this way: The pressure exerted is transmitted through the spring 31 and the extent that the spring is compressed governs the pressure. Therefore the relative positions of the spring cylinder 28 and the plunger 30 varies with compression of the spring 31 and inasmuch as the fluid cylinder 34 is mounted on the spring cylinder 28 and the piston 35 is connected by its piston rod 36 with the plunger 30, compression of the spring 31 will raise the piston 35 in the cylinder 34 and will force the liquid therein out of the cylinder 34 through the hose 39 into the transparent tube 37 where its level may be seen by the operator. The level of the fluid in the tube 37 as appearing opposite the graduations on the base 38 will therefore indicate the extent of the compression of the spring 31 and therefore the pressure exerted by the adjusting mechanism to force the blade 12 against the road.

The operation of the motor 20 to actuate the adjusting mechanism to either raise or lower the blade is controlled at the driver's seat by means of an electric switch 40 which controls the electric current to rotate the motor in either direction. Electric current is derived from any suitable source such as the customary storage battery 41 forming a part of the motor vehicle equipment and in the present illustration one pole 42 of the battery 41 is grounded and the other pole is connected by the conductor 43 to the rotor 44 of the switch 40. The switch also contains two contacts 45 and 46 with which the rotor 44 may be respectively engaged by rotating the rotor by the hand lever 47. The contacts 45 and 46 are connected to the motor by conductors 48 and 49, respectively, whereby current directed through either of them will rotate the motor in either of its opposite directions of rotation, the motor being of conventional reversible type adapted to operate and to be controlled in the above described manner. It is to be understood that the motor is also grounded in the case where one pole of the battery is grounded or if preferred the pole of the battery instead of being grounded may be connected directly to the motor.

A safety means to prevent operation of the adjusting mechanism too far in either direction is provided in the form of two circuit breakers 50 and 51. Each of these circuit breakers includes a movable arm 50a and 51a, respectively, which are located in the path of a lug 52 extending from the hub of the arm 27. The circuit breaker 50 is connected in the conductor 48 and the circuit breaker 51 is connected in the conductor 49 and they are so located with respect to the extreme movements of the lug 52 that the said lug will engage the movable arm of either circuit breaker at the extremity of its movement in one direction or the other and will separate the contact points of the circuit breaker to break the circuit in the conductor. Therefore, assuming that the conductor 48 is utilized to supply current to rotate the motor to lower the scraper blade, then when the arm 27 has moved downwardly as far as it is intended to move the lug 52 will engage the arm 50a of the circuit breaker 50 and break the circuit in the conductor 48 thereby stopping further rotation of the motor. A similar operation is true with respect to the opposite movement of the arm 27 in raising the blade in which movement, and at the extremity thereof, the lug 52 engages the arm 51a of the circuit breaker 51 and breaks the circuit in the conductor 49 which is used to supply current to the motor for the upward movement of the blade.

The conductors 48 and 49 are preferably joined together in the form of a single flexible cable and if desired the hose 39 may also be joined in the same flexible cable and these three members constitute the only connections between the adjusting mechanism which is mounted upon the beam 7 and the controlling and indicating mechanism at the driver's seat. Therefore it will be readily understood that the angular position of the beam 7 in a horinzontal plane may be adjusted at will without interfering with the connections between the beam and the driver's seat inasmuch as these connections are in the nature of a flexible cable as above described. This flexible cable connection also facilitates the attachment of the complete device to vehicles of considerable varying dimensions. The cable connections may be provided sufficiently long to extend from the driver's seat to the beam on a vehicle of long dimensions and if the device is attached to a vehicle of shorter dimensions the superfluous length of cable may either be coiled and suspended out of the way or the superfluous length may be cut off if desired.

The use of the worm and gear drive provides a substantial lock for holding the blade 12 in a position to which it may be adjusted.

In other words rotation of the worm 22 by means of the motor will readily actuate the gears and levers to raise or lower the blade 12 but it is practically impossible to cause rotation of the worm 22 by exerting power through the blade 12 or the various levers and therefore the worm and gear drive also constitutes an efficient lock.

The invention is defined in the appended claims and is to be considered comprehensive of all forms of structure coming within their scope.

I claim:

1. A road scraper comprising a scraper blade, means for mounting the scraper blade to be moved into or out of engagement with a road surface, an electrically operated adjusting mechanism associated with said scraper blade for moving it in either of said directions, a remotely located controlling device for controlling the operation of said electric adjusting device in either direction, flexible conductors extending between said controlling device and said electrical adjusting device and automatic means for breaking the electric circuit when the adjusting device has reached its maximum position in one direction.

2. A road scraper comprising a scraper blade, means for mounting said scraper blade to be moved into or out of engagement with a road surface, a reversible electric motor, a worm driven by said motor, a worm gear meshing with and driven by said worm, connecting means actuated by said worm gear and connected with said scraper blade for moving the scraper blade in either of its said directions, cushion means incorporated in said connection means for varying the pressure of the scraper blade against the road, means for controlling the rotation of said motor in either direction located remotely from said scraper blade and adjusting mechanism, flexible electric conductors extending between said controlling device and said motor, and indicating means associated with said cushion means for indicating the pressure of the scraper blade against the road.

3. A road scraper comprising a scraper blade, means for mounting said scraper blade to be moved into or out of engagement with a road surface, a reversible electric motor, a worm driven by said motor, a worm gear meshing with and driven by said worm, connecting means actuated by said worm gear and connected with said scraper blade for moving the scraper blade in either of its said directions, cushion means incorporated in said connecting means for varying the pressure of the scraper blade against the road, means for controlling the rotation of said motor in either direction located remotely from said scraper blade and adjusting mechanism, flexible electric conductors extending between said controlling device and said motor, and indicating means associated with said cushion means comprising an actuating element actuated by said cushion means, a visible element located remotely from the scraper structure and a flexible conductor extending between the actuating element and the visible element for conducting the actuating medium.

4. The combination with a road scraper having a scraper blade mounted to be moved into engagement with a road surface of power means, connecting means between said power means and said road scraper for pressing the scraper blade against the road surface, said connecting means comprising two members movable relative to each other and spring connected whereby power is exerted through said spring and compression of said spring results in relative movement of said connecting members and an indicating device comprising a cylinder connected to one of said connecting members, a piston in said cylinder connected to the other of said connecting members, fluid in said cylinder, an outlet passage from said cylinder and visible means for indicating the amount of fluid which is forced out of said cylinder by movement of said piston therein.

5. The combination with a vehicle of a road scraper comprising a beam, means for mounting said beam on said vehicle for angular adjustment in a horizontal plane, a scraper blade, means for mounting said scraper blade on said beam to be moved into or out of engagement with a road surface, a reversible electric motor, a worm driven by said motor, a worm gear meshing with and driven by said worm, an arm mounted for swinging movement and actuated by said worm gear, a connecting means associated with said swinging arm and said scraper blade whereby movement of the arm in either direction will move the scraper blade in either of its said directions, an electric control device located on the vehicle remotely from said scraper structure, flexible electric conductors extending between said motor and said electric controlling device, and a circuit breaker associated with one of said electric conductors and actuated by said swinging arm at the extremity of its movement in one direction to break the electric circuit to said motor.

6. The combination with a vehicle of a road scraper, comprising a beam, means for mounting said beam on said vehicle for angular adjustment in a horizontal plane, a scraper blade, means for mounting said scraper blade on said beam to be moved into or out of engagement with a road surface, a reversible electric motor, a worm driven by said motor, a worm gear meshing with and driven by said worm gear, a connecting member having two spring connected parts movable relative to each other, one of said parts being connected to said swinging arm and the other of said parts being connected to said scraper blade whereby movement of said arm will move said scraper blade and the force of said arm will be transmitted through said spring to exert variable pressures of said scraper blade against said road surface, an electric control device located on the vehicle remotely from said scraper structure and flexible electric conductors extending between said motor and said electric controlling device.

7. The combination with a vehicle of a road scraper, comprising a beam, means for mounting said beam on said vehicle for angular adjustment in a horizontal plane, a scraper blade, means for mounting said scraper blade on said beam to be moved into or out of engagement with a road surface, a reversible electric motor, a worm driven by said motor, a worm gear meshing with and driven by said worm, an arm mounted for swinging movement and actuated by said worm gear, a connecting member having two spring connected parts movable relative to each other, one of said parts being connected to said swinging arm and the other of said parts being connected to said scraper blade whereby movement of said arm will move said scraper blade and the force of said arm will be transmitted through said spring to exert variable pressures of said scraper blade against said road surface, a fluid cylinder attached to one of said connecting members, a piston in said cylinder attached to the other of said connecting members, a visible indicator located on said vehicle remote from said scraper structure, a flexible fluid container extending between said fluid cylinder and said visible indicator, fluid in said fluid cylinder and said flexible fluid container, an electric control device located on the vehicle remotely from said scraper structure and flexible electric conductors extending between said motor and said electric controlling device.

8. The combination with a vehicle of a road scraper, comprising a beam, means for mounting said beam on said vehicle for angular adjustment in a horizontal plane, a scraper blade, means for mounting said scraper blade on said beam to be moved into or out of engagement with a road surface, a reversible electric motor, a worm driven by said motor, a worm gear meshing with and driven by said worm, an arm mounted for swinging movement and actuated by said worm gear, a connecting member having two spring connected parts movable relative to each other, one of said parts being connected to said swinging arm and the other of said parts being connected to said scraper blade whereby movement of said arm will move said scraper blade and the force of said arm will be transmitted through said spring to exert variable pressures of said scraper blade against said road surface, an electric control device located on the vehicle remotely from said scraper structure, flexible electric conductors extending between said motor and said electric controlling device, and a contact breaker associated with one of said electric conductors and actuated by said swinging arm at the extremity of its movement in one direction to break the circuit in said electric conductor.

9. A road scraper comprising a scraper blade, means for mounting the scraper blade to be moved into or out of engagement with a road surface, an electrically operated adjusting mechanism associated with said scraper blade for moving it in either of said directions, a remotely located controlling device for controlling the operation of said electric adjusting device in either direction, flexible conductors extending between said controlling device and said electrical adjusting device, and means located remotely from the scraper structure for indicating the degree of the pressure with which it engages the road and a flexible element to convey the actuating medium for said indicating means.

10. In a road scraper having a scraping blade and means to move the blade against the road with varying force, the combination of an indicating device located on the scraper remotely from the blade, means, movable in proportion to the amount of force exerted on said blade, associated therewith, and additional means between the last mentioned means and the indicating device whereby the latter is indicative of the amount of force exerted on said blade.

11. A road scraper, a blade, means for moving said blade against the road with varying force, said means including two telescoping members with a spring therebetween whereby they are yieldably held apart, indicating means, means located on said telescoping members and actuated by relative movement between to place a medium under pressure, and conductor means connecting the last mentioned means to the indicating means whereby said indicating means is responsive to and indicative of the force with which the blade is pressed against the road.

12. In a road scraper having a scraper blade, means for mounting the scraper blade to be moved into or out of engagement with a road surface, the combination of an electric motor and circuit having a circuit breaker therefor, mechanism between the electric motor and the scraper blade to actuate the latter to and from its operative position, said electric circuit breaker comprising, a movable arm and a stationary arm, said arms contacting, and means on said mechanism operating the circuit-breaker when the scraper blade is at a predetermined position.

13. A road scraper comprising a scraper blade, means for mounting the scraper blade to be moved into or out of engagement with a road surface, an electrically operated adjusting mechanism associated with said scraper blade for moving it in either of said directions, a remotely located controlling device for controlling the operation of said electric adjusting device in either direction, flexible conductors extending between said controlling device and said electrical adjusting device, and means located remotely from the scraper structure for indicating the degree of such pressure, a flexible element to convey the actuating medium for said indicating means and automatic means for breaking the electric circuit when the adjusting device has reached its maximum position in one direction.

In testimony whereof I affix my signature.

GEORGE E. DEAN.